United States Patent Office 3,382,255
Patented May 7, 1968

3,382,255
EPOXIDIZED OLEFINIC POLYMERS
R Winslow White, Willingboro, N.J., assignor to Rohm
& Haas Company, Philadelphia, Pa., a corporation of
Delaware
No Drawing. Filed Sept. 23, 1964, Ser. No. 398,785
5 Claims. (Cl. 260—348)

ABSTRACT OF THE DISCLOSURE

This invention is directed to specific epoxidized olefinic polymers that are prepared by the reaction of a polymer derived from an olefin containing 2 to 12 carbon atoms and a peracid. The epoxidized polymers are useful as surface impregnants for leather.

---

This invention deals with specific epoxidized olefinic polymers as new compositions of matter. It further deals with a method for the preparation of these specific epoxidized olefinic polymers.

The specific epoxidized olefinic polymers of this invention may be represented by the formula

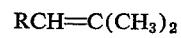

wherein R is an alkyl group derived from an olefinic polymer formed from olefins containing 2 to 12 carbon atoms, preferably 2 to 5 carbon atoms, and most advantageously, 4 carbon atoms. The olefinic polymers are prepared by addition polymerization from pure olefins whether gaseous or liquid under normal conditions and are frequently obtained by the cracking of petroleum and other hydrocarbons. Fractions containing olefinically unsaturated open-chain hydrocarbons are readily available over a wide range of molecular weights and derived from olefins of 2 to 12 carbon atoms. The preferred olefins are those from 2 to 5 carbon atoms, with particular emphasis on the olefin embodiments containing 4 carbon atoms. It is, of course, preferred to employ relatively pure olefins from which sulfur, cyclic compounds and other impurities have been removed.

Mixtures of various olefins, from ethylene to dodecene, may be used or individual embodiments, as desired. Mixtures of specific olefins, from ethylene to pentene, may be advantageously employed. Particularly advantageous for the present purposes are mixtures of the various butenes. Butenes most commonly used comprise both straight and branched chain members. It is also possible, and frequently desirable, to employ a particular isomer, such as isobutylene, but, for purposes of this invention, separation or isolation of particular isomers is not essential. Thus, the mixtures readily available to the chemical industry are especially useful for the purposes of the present invention. The olefinic polymers employed as starting materials vary from rather fluid liquids to rather viscous liquids at normal temperatures.

Typical olefinic polymers are those prepared from ethylene, propylene, isobutene, 1-butene, 2-butene, 1-pentene, 2-pentene, 1-hexene, 1-octene, 2-octene, 1-decene, 1-dodecene and 2-dodecene.

The R group is an alkyl radical within the scope of the above discussion and will contain 30 to 200 carbon atoms and will, therefore, have a molecular weight that will range from about 400 to 3000. The preferred embodiments of R are those in which the molecular weight will range from 600 to about 2500.

While the epoxidized olefinic polymers have been represented structurally heretofore, there may occasionally be present in the product, particularly when the R group represents a molecular weight of less than 600, small amounts of compounds having the structure

wherein the $R^1$'s are alkyl groups having a total carbon content within the definition of R given heretofore. These structures are within the contemplation and gamut of this invention.

The compounds of the present invention are prepared by reacting a peracid with a compound having the formula $$RCH=C(CH_3)_2$$

Suitable and typical peracids include performic, peracetic, perbenzoic, perphthalic and others. Performic and peracetic acids are preferred. The reaction is conducted in the temperature range of about 10° to 100° C., preferably about 25° to 60° C. The reaction may be satisfactorily conducted at room temperatures when peracetic acid is used.

The reaction is conducted in the presence of an inert volatile organic solvent since the olefinic reactant is viscous and the reaction is exothermic in nature. Suitable solvents are saturated alkanes, aromatics, chlorinated alkanes, chlorinated aromatics, and the like. Typical embodiments include hexane, octane, benzene, toluene, xylene, chloroform, carbon tetrachloride, chlorobenzene, and the like.

Pressure is not critical in the present situation and atmospheric, subatmospheric or superatmospheric pressures may be employed, as desired.

While the order of addition of the reactants is not particularly critical, it is preferred to add the peracid to the olefinic polymer.

It is also preferred to add gradually the peracid to the olefinic polymer in order to control the exothermic heat of reaction.

At the conclusion of the reaction, the mixture is washed with water and dilute caustic, such as sodium hydroxide to remove any excess acid. The solvent may then be removed at reduced pressure by standard techniques, such as distillation, leaving the product as the residue.

The present compounds are useful as surface impregnants for leather, when employed in the usual amounts by standard techniques. Leather treated with the compounds of the present invention exhibit no grain cracking in standard grain evaluations. The break of the leather is improved, particularly the deep break. Also, the temper is improved.

The present invention may be more fully understood from the following illustrative examples:

Example 1

To a solution of 200 grams (0.5 M) of a polybutene of average molecular weight 400 in 300 ml. of heptane is added over a one hour period 100 grams (0.525 M) of a 40% peracetic acid solution. The temperature is held between 25°–30° C. by external cooling as needed. The solution is stirred one hour after addition is complete, and the aqueous lower layer is separated. The organic phase is washed with 10% sodium carbonate solution and solvent is removed in vacuo to yield the water-white residue. The product is analyzed for oxygen: Found, 3.6% (Theoretical for one atom oxygen—3.8%).

Example 2

To a solution of 600 grams (0.25 M) of a polybutene of average molecular weight 2400 in 1 l. of benzene is added over a 20 minute period 57 grams (0.3 M) of 40% peracetic acid solution. The temperature of the solution rose from 23 to 28° C. The product is isolated as described in Example 1 to yield a highly viscous colorless epoxide. Samples of the starting olefin and product are sent for oxygen analysis.

Olefin—Found: 0.02%; 0.05% oxygen
Product—Found: 0.63%, 0.61% oxygen (calc. for 1 oxygen/2400 molecular weight—0.67%).

Example 3

Into a stirred mixture of 600 grams (0.5 M) of a polybutene of average molecular weight 1200 in 600 grams of perchloroethylene held at 55° C. are added 31.5 grams (0.65 M) of 70% hydrogen peroxide and 6.4 grams (0.125 M) of 90% formic acid. Addition of both reagents is complete in one hour, the solution is held at 55° for two hours further, and 100 ml. of water are added. The organic layer is separated and solvent is removed in vacuo to leave the product as a colorless viscous liquid. A sample is analyzed for oxygen—found: 1.35, 1.29% oxygen (calc. for 1 oxygen/1200 molecular weight—1.33).

Example 4

A solution of 100 grams (0.55 M) of perphthalic acid in 300 ml. of methylene chloride is added over a one hour period to a solution of 440 grams (0.5 M) of a polybutene of average molecular weight of 880 in 500 ml. of methylene chloride. After three hours stirring, the solution is washed with dilute caustic, dried and the solvent removed to yield the product as a colorless liquid. Analysis showed one atom of oxygen per 900 molecular weight.

Example 5

To a solution of 600 grams (0.5 M) of a dodecene-1 polymer of average molecular weight 1200 in 1 liter of toluene is added 114 grams (0.6 M) of 40% peracetic acid over a one hour period and the solution is stirred at room temperature overnight. The organic layer is separated, washed with dilute caustic, and the solvent removed to yield the epoxy product. Analysis showed that one atom of oxygen has been added per 1200 grams.

Example 6

Into a solution of 60 grams (0.05 M) of polyethylene in 600 ml. of heptane at 60° C. is added 5 grams (0.1 M) of 70% hydrogen peroxide and 1.3 grams (0.025 M) of 90% formic acid. The solution is held at 60° C. overnight, washed with dilute caustic and the solvent is removed to yield the epoxidized polyethylene.

I claim:

1. As a new composition of matter, an epoxidized olefinic polymer having the formula

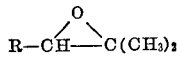

wherein R represents an alkyl group containing about 30 to 200 carbon atoms which is derived from an olefin containing 2 to 12 carbon atoms.

2. As a new composition of matter, an epoxidized polybutene having the formula

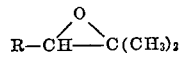

wherein R represents an alkyl group containing about 30 to 200 carbon atoms and which is derived from butene.

3. An epoxidized olefinic polymer according to claim 1 wherein R is derived from an olefin containing 2 to 5 carbon atoms.

4. A composition according to claim 1 wherein the molecular weight of the R group ranges from about 400 to about 3000.

5. A composition according to claim 1 wherein the molecular weight of the R group ranges from about 600 to about 2500.

References Cited

UNITED STATES PATENTS 3,155,638   11/1964   Mueller et al. _____ 260—348

JOSEPH L. SCHOFER, *Primary Examiner.*

L. EDELMAN, *Assistant Examiner.*